United States Patent
Lankreijer

(10) Patent No.: US 10,303,404 B2
(45) Date of Patent: May 28, 2019

(54) METHOD FOR OPERATING A PRINT SERVER FOR DIGITAL HIGH-CAPACITY PRINTING SYSTEMS

(71) Applicant: Océ Holding B.V., Venlo (NL)

(72) Inventor: Herman Lankreijer, Hofsingelding (DE)

(73) Assignee: Océ Holding B.V., Venlo (NL)

(*) Notice: Subject to any disclaimer, the term of this patent is extended or adjusted under 35 U.S.C. 154(b) by 0 days.

(21) Appl. No.: 15/848,873

(22) Filed: Dec. 20, 2017

(65) Prior Publication Data
US 2018/0173467 A1    Jun. 21, 2018

(30) Foreign Application Priority Data
Dec. 20, 2016 (DE) .................. 10 2016 125 023

(51) Int. Cl.
    *G06F 3/12* (2006.01)
    *G06F 9/50* (2006.01)
    *G06F 17/18* (2006.01)

(52) U.S. Cl.
    CPC ............ *G06F 3/121* (2013.01); *G06F 3/1224* (2013.01); *G06F 3/1229* (2013.01); *G06F 3/1273* (2013.01); *G06F 3/1282* (2013.01); *G06F 3/1288* (2013.01); *G06F 9/5088* (2013.01); *G06F 17/18* (2013.01)

(58) Field of Classification Search
    CPC ...... G06F 3/121; G06F 3/1224; G06F 3/1229; G06F 3/1273; G06F 3/1282; G06F 3/1288; G06F 17/18
    See application file for complete search history.

(56) References Cited

U.S. PATENT DOCUMENTS

| | | |
|---|---|---|
| 7,050,184 B1 | 5/2006 | Miyamoto |
| 8,688,925 B2 | 4/2014 | Lankreijer |
| 2002/0140959 A1 | 10/2002 | Harper |
| 2003/0158930 A1 | 8/2003 | McBride |
| 2010/0094676 A1 | 4/2010 | Perra et al. |
| 2012/0042065 A1 | 2/2012 | Takahashi |

(Continued)

FOREIGN PATENT DOCUMENTS

DE    102008037651 B4    8/2010

OTHER PUBLICATIONS

Digital Printing, Technology and Printing Techniques of Océ Digital Printing Presses, 9th Edition, Feb. 2005, ISBN 3-00-001081-5.

(Continued)

*Primary Examiner* — Iriana Cruz
(74) *Attorney, Agent, or Firm* — Schiff Hardin LLP

(57) ABSTRACT

In a print server for digital high-capacity printing systems, print jobs are received, processed with predetermined application processes, and relayed to one or more printers. A method to operate the print server can include monitoring, using a collect trigger, status parameters which describe system statuses; and triggering, using trigger logic, filters to reading additional status parameters that include process statuses of application processes executed at the print server. The triggering of the filters can be based on whether the system statuses monitored with the collect trigger represent an extraordinary or abnormal operating status.

19 Claims, 7 Drawing Sheets

(56) References Cited

U.S. PATENT DOCUMENTS

| 2013/0314729 A1* | 11/2013 | Sato ................... G06K 15/1807 |
| | | 358/1.13 |
| 2016/0110653 A1* | 4/2016 | Foley ..................... G06N 7/005 |
| | | 706/12 |
| 2016/0196738 A1* | 7/2016 | Viggedal .............. G08B 25/002 |
| | | 340/506 |

OTHER PUBLICATIONS

German Search Report dated Mar. 16, 2017 in German Application No. 10 2016 125 023.6.
"Kernel Hook-Prozess-Filter" ["Kernel Hook Process Filter"], Walter Sprenger, IT-security-Special Mar. 2003, pp. 39-41, and English translation.

* cited by examiner

```
ConfigFileVersion=5.04
DiagDir=/u/prismapro/diag/sysmon/
ScanFrequency=1
TraceFlags=0xfffffffb9
TraceLevel=3
WriteFilterMonitorData=no
WriteFilterLog=yes
WriteFilterIgnore=no
WriteTriggerMonitorData=no
WriteTriggerLog=yes
WriteTriggerIgnore=no

# CPU load is high, document which processes cause
this
[CPU Load]
Trigger=cpu.%acidle<40:<20|cpu.ldav-15>30:>50
Filter=P.%CPU>30
WarnActionType=<None>
WarnActionData=
WarnUserMessag=70000000,W
ErrActionType= ExeStartShort
ErrActionData='top –b –n 1','CPU.txt',once
ErrUserMessage=70000001,E
[Total System File Handles]
Trigger=handles.%UsedFHd>70:>90
Filter=P.NoDFs>100
WarnActionType=<None>
WarnActionData=
WarnUserMessag=
ErrActionType=<None>
ErrActionData=
ErrUserMessage=

# Network utilisation is high
[Network utilisation]
Trigger=network.%totutil>70:>80
Filter=P.NoSoc>1&P.%CPU>10
WarnActionType=<None>
WarnActionData=
WarnUserMessag=
ErrActionType=<None>
ErrActionData=
ErrUserMessage=
```

FIG. 5

METHOD FOR OPERATING A PRINT SERVER FOR DIGITAL HIGH-CAPACITY PRINTING SYSTEMS

CROSS REFERENCE TO RELATED APPLICATIONS

This patent application claims priority to German Patent Application No. 102016125023.6, filed Dec. 20, 2016, which is incorporated herein by reference in its entirety.

BACKGROUND

The present disclosure relates to a method for operating a print server for digital high-capacity printing systems, as well as a corresponding print server.

Print servers for high-capacity printers are described in, for example, chapter 15 of the book "Digital Printing, Technology and Printing Techniques of Océ Digital Printing Presses", 9th Edition, February 2005, ISBN 3-00-001081-5. Schematically shown herein is the workflow of a method used in an Océ PRISMA production document output management system for communication between two processes of a computer system for transferring print data.

Operating systems are necessary for the operation of computers. These operating systems then normally in turn include an operating system kernel as their central component. In the kernel, process and data organizations are normally established, upon which build additional software components of the operating system, and possibly of user programs. Typical requirements for a system kernel are parallel processing of different tasks, what is known as multitasking; compliance with time-critical limits; and transparency to other applications.

Kernels are normally constructed in layers, wherein the lower, machine-proximal layers form the basis for those above them. The upper layers may thereby typically call functions of the lower layers, but not vice versa.

The following layers may in particular be present, from the bottom to the top:
interface layer for hardware (e.g. input/output (I/O) devices, memory, processors),
layer for memory administration, in particular including virtual main memory
layer for process administration (scheduler)
layer for device administration (device management)
layer for administration of the file systems.

If all of these functions or layers are integrated into the kernel itself, it is referred to as a monolithic kernel. In a microkernel, portions of this occur in separate processes. User processes also run outside of the kernel, and can operate the functions offered by the kernel in order to communicate with the aforementioned components of the computer.

Kernel hooks serve as an interface to enable the calling of a routine outside of the kernel at specific locations within a kernel. The use of kernel hooks is described in "Kernel Hook-Prozess-Filter" ["Kernel Hook Process Filter"], Walter Sprenger, IT-security-Special March 2003, Page 39 and the following, for example. With a kernel hook, a program code may be linked into an existing program. A kernel hook normally has unrestricted access to the entire system.

DE 10 2008 037 651 B4 describes a method for communication between two application programs that may be used for communication of print data in printing systems.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 5 illustrates an example section of a configuration file for the configuration of a System Resource Manager (SRM) according to an exemplary embodiment of the present disclosure.

Figure 1:
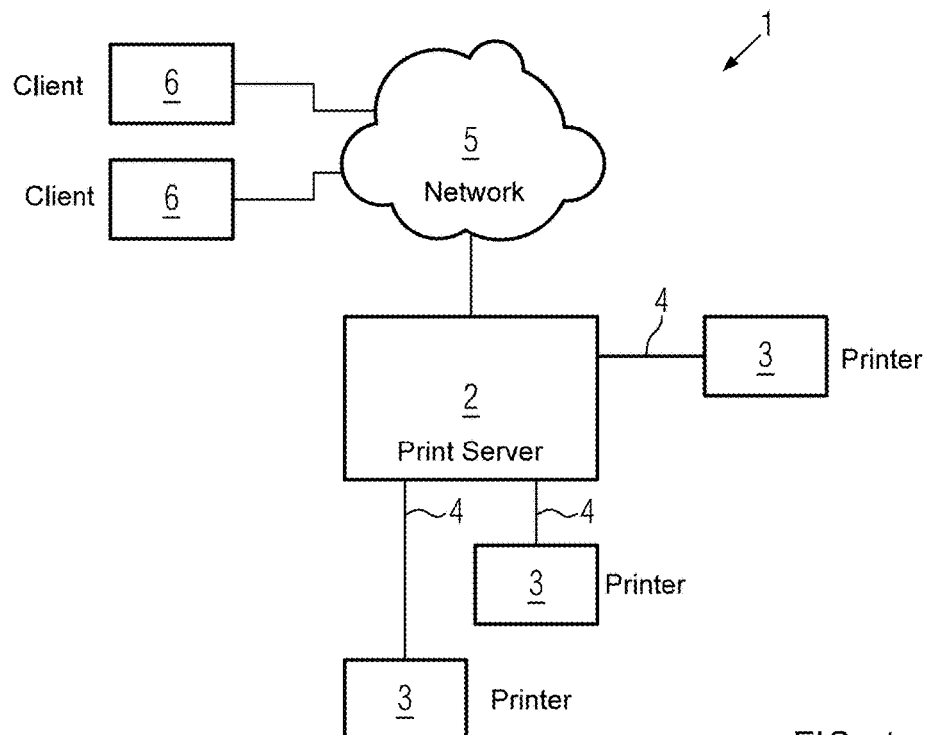
FIG. 1 illustrates a printing system having a print server according to an exemplary embodiment of the present disclosure.

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

The present disclosure relates to a method to operate a print server for digital high-capacity printing systems with which the printing operation may be controlled very efficiently, as well as the printer server itself.

Aspects of the present disclosure relate to the operation of a print server for digital high-capacity printing systems. In an exemplary embodiment, the operation includes:
reading, using a collect trigger, of status parameters which describe system statuses, for example the load of a CPU, the load of a working memory, the load of a file system, the load of a network, and/or the load of a system interface, and
triggering of filters to read additional status parameters which include process statuses of application processes executed at the print server, where the triggering is executed with a trigger logic depending on whether the system statuses detected with the collect trigger represent an extraordinary (abnormal) operating status.

In an exemplary embodiment, values of status parameters which described system statuses are initially read. If these values represent an extraordinary status, filters are then triggered in order to read the values of status parameters which describe process statuses of application processes executed by a print server.

In an exemplary embodiment, the process is based on the realization that the causes for a status with limited functionality may be very different. They are most often in the area of the application processes. However, such causes always affect status parameters at the system layer. For the most part, a component of the system, for example the CPU, an interface, a data connection or a memory, is then overloaded, such that the other components are delayed until the overloaded resource is again at a normal load in order to be able to resume their operation at normal performance. It is therefore normally sufficient to monitor a few status parameters at the system layer in order to detect the danger of a status with limited functionality early. The number of status parameters to be monitored is preferably not greater than fifty, not greater than twenty, in particular not greater than fifteen, and often even not more than ten status parameters is sufficient. In an exemplary embodiment, the number of monitored status parameters corresponds to the number of triggers in the collect trigger. A status parameter may also be monitored across multiple components with one trigger.

Given the limited status parameters, the status parameters can be monitored with little cost.

In an exemplary embodiment, if the danger of an extraordinary (e.g. printer stoppage and/or defective component(s) of the printer and/or print server) status is detected using these values of the system-specific status parameters, filters are then triggered which read values of additional status parameters that include process statuses of processes and in particular application processes executed at the print server. A comprehensive picture of the respective operating status is hereby detected. However, this is executed only if the danger of such an extraordinary status has been detected using the system-specific status parameters. In an exemplary embodiment, the detection of values of status parameters that describe process statuses can be limited to a particular time period in which the situations of interest here occur, and the specific parameters that are relevant to this situation.

In an exemplary embodiment, the collect trigger and the trigger logic are respective configured as separate threads. The collect trigger is configured to read the values of the system-specific status parameters. In an exemplary embodiment, the collect trigger threads have a limited functionality. For example, the collect trigger threads can have no additional task other than the reading of system-specific status parameter values. In this example, the reading of these values may take place very quickly, whereby an operating status is very realistically reflected by the multiple values. If the collect trigger threads were to encompass multiple tasks, the reading of the values of the status parameters would take place more slowly. A computer system may change its status within a short time. The danger would then exist that the individual read values would describe different operating statuses (e.g. non-current status values). The separation into one thread that reads out the values and one thread that performs the evaluation of the values increases the quality of the read-out values for describing an operating status.

The read (and possibly filtered) values may be provided via a data interface to a performance balancer to control print services at the print server.

A statistics evaluator may also be provided that is configured to statistically evaluate the read and possibly filtered values of the status parameters.

A logger is configured to store the read and possibly filtered values of the status parameters logger.

In an exemplary embodiment, a print server is provided with a computer program that is configured to execute the method described herein.

In an exemplary embodiment, a print server includes a processor circuitry (e.g. CPU) and a memory that can store a computer program. The print server can be configured for digital high capacity printing systems. The processor circuitry of the printer server can be configured to access the memory and execute the computer program to control the process print jobs that are received by the print server. For example, the print jobs can be processed with predetermined application processes. The processor circuitry can be configured to relay the processed print jobs to one or more printing apparatuses (e.g. printers). In an exemplary embodiment, the processor circuitry can be configured to execute the computer program to execute the methods according one or more exemplary embodiments.

Although exemplary embodiments are described for application at a print server, the monitoring of the operating statuses may also be used at computer systems configured for other applications.

FIG. 1 illustrates a printing system 1 according to an exemplary embodiment. In an exemplary embodiment, the printing system 1 includes a print server 2 to which one or more printers 3 can be connected via a respective data line 4. The data line 4 normally corresponds to a network standard, for example Ethernet, but is not limited thereto.

The print server 2 is connected with a network (LAN or WAN), and in particular with the Internet (or other network) 5, to which are connected one or more clients 6 at which print jobs are generated and transmitted to the print server 2 via the Internet 5.

The print server 2 receives the print jobs and relays them to the respective printing apparatuses 3. The print jobs are cached in the print server 2, processed as necessary so that they may be received by the print server 2, are rastered at the printer(s) 3, and may be printed out. At the print server, an operator also has the possibility of viewing the print jobs, for example with what is known as a preview program, wherein he may review individual pages and influence the relaying and processing of the print jobs at the print server.

Such print servers which relay print data to one or more printers are typically used in high-capacity printing. What is to be understood as high-capacity printing is the use of a printer that can print to at least 5 pages of DIN A4 size per second. However, printing apparatuses for high-capacity printing may also be designed for higher printing speeds, for example at least 30 pages of DIN A4 per second, and in particular at least 50 pages of DIN A4 per second, and more specifically, at least 90 pages of DIN A4 per second. The printers are digital printers, meaning that print data are transmitted to them in digital form, which print data are translated at a print head in the printer 3 into a print image that is applied onto a recording medium (e.g. paper) by a print color (i.e. printing ink). The printer can be, for example, an inkjet printer or an electrophotographic printer, but is not limited thereto. The print color can be a liquid toner in one or more embodiments.

Empirically, the amount of data of a color page of DIN A4 size in PDF format is on average 0.5 to 2 MB, for instance. Given a data amount of 2 MB per page and a print speed of 50 pages per second, this means that a print data stream of 100 MB/sec is supplied to the printing apparatus. These print data have not yet been rastered. Given high-resolution color printing, and in particular given a printing and/or given documents in which multiple images are anchored, the data amount per DIN A4 page may be 10 to 25 MB, and in the extreme case up to 600 MB.

The print server 2 therefore must receive a significant data stream, assign the data contained therein to the individual printing apparatuses 3, and adapt said data if applicable. Such an adaptation may include a changing of the format of the print data stream (IPDS, PCL, pdf etc.), a scaling of the print data, a change to the resolution of the print data, or another adaptation of the print data to the requirements of the respective printing apparatus or to special requirements of the operator of the printing apparatus or of a customer of a print job.

Figure 2:
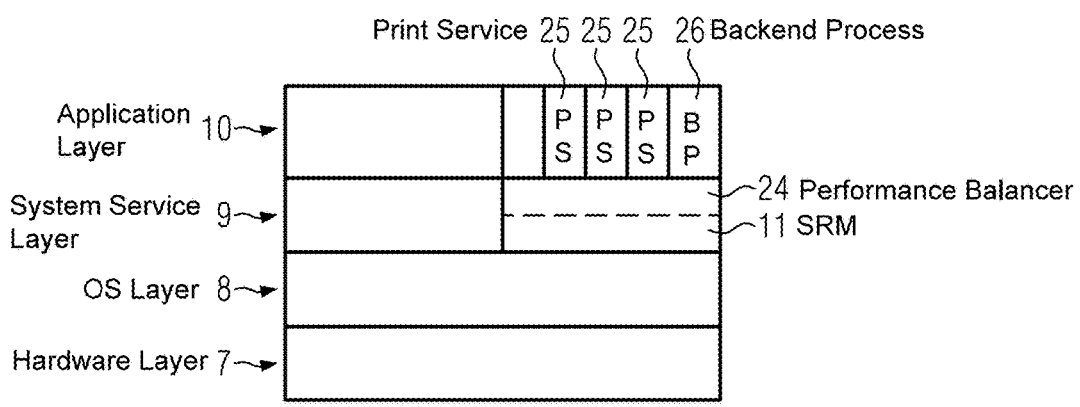
FIG. 2 illustrates a schematic layer model of the print server from FIG. 1 according to an exemplary embodiment of the present disclosure.

FIG. 2 illustrates the print server 2 according to an exemplary embodiment. In FIG. 2, the print server 2 is schematically depicted in a layer model. A lowermost Hardware layer 7 includes the hardware of the print server. This hardware layer contains processor circuitry (e.g. at least one CPU), a memory, interfaces and peripheral devices, in particular a display device (monitor) and one or more input devices (keyboard, mouse etc.). Arranged immediately above the hardware layer 7 is an operating system layer 8 which controls the basic functions of the hardware layer 7. In an exemplary embodiment, the operating system layer 8 includes a kernel, such as a Linux kernel. The operating system layer 8 can include at least one logical file system, a logical memory system, a memory page administration, a bus driver, and additional drivers for system-relevant components, for example interfaces, mass storage components (hard drives, for example), a file access controller and interfaces to processes of applications. The operating system regulates access to the hardware using corresponding interfaces; memory administration, wherein a virtual main memory is provided; process administration, wherein the corresponding component of the operating system is normally referred to as a scheduler; device administration, wherein the corresponding component is normally referred to as device management; and the administration of the file systems. In a monolithic kernel, all of these functions are combined. Outside of the kernel, only the user processes are executed, which operate the functions offered by the kernel in order to be able to communicate with the hardware. However, microkernels are also known in which a portion of these functions are outsourced.

A system service layer 9 (also referred to as daemons 9 or daemons layer 9) is arranged atop the operating system layer 8. The daemons layer 9 includes daemons that are programs that run in the background.

Provided above the daemon layer 9 is an application layer 9 with one or more additional applications, in which are contained processes that are program sections that control the functions to be executed with the print server 2.

This layer design with a hardware layer 7, an operating system (OS) layer 8, a System Service (daemon) layer 9 and an application layer 10 represent a configuration of an example computer system. The daemon layer 9 can include programs that run in the background, which are referred to as daemons. Such daemons may be a component of the operating system and of the application program. In an exemplary embodiment, the processor circuitry of the hardware layer 7 can be configured to perform one or more functions and/or operations of the OS layer 8, the daemons layer 9, and/or the application layer 10. For example, one or programs of the OS layer 8, the daemons layer 9, and/or the application layer 10, when executed by one or more processors of the hardware layer 7, can cause the processor(s) to perform the corresponding functions and/or operations defined in/by the program(s).

In an exemplary embodiment, the daemon layer 9 includes a system resource manager (SRM) 11. The SRM 11 is a daemon that is part of the application program and utilizes the same interfaces to the kernel as the application programs of the application layer 10.

In an exemplary embodiment, the SMR 11 is configured is to detect the status of the print server 2, and in particular, to promptly detect extraordinary statuses with limited functionality and log statuses with limited functionality. Statuses with limited functionality are, for example, statuses in which specific resources or system resources—for example the CPU, data connections (data bus, interfaces)—are overloaded.

Figure 4:
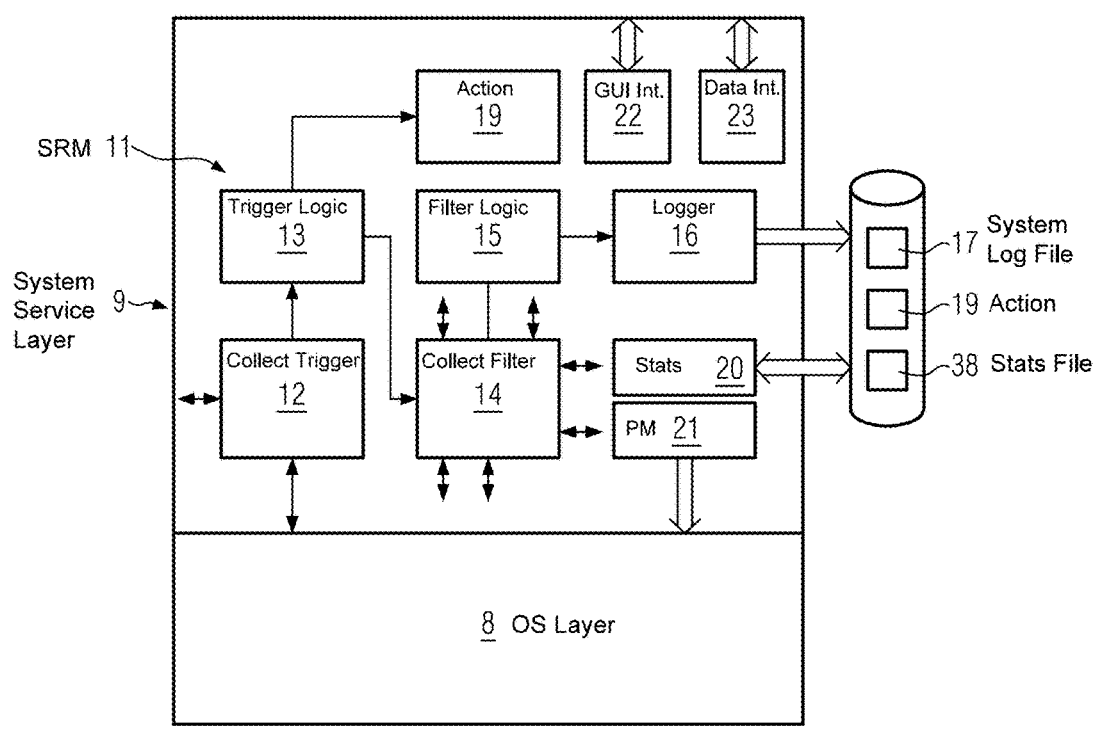
FIG. 4 illustrates a resource manager according to an exemplary embodiment of the present disclosure.

As shown in FIG. 4, in an exemplary embodiment, the SRM 11 includes a collect trigger 12, trigger logic 13, a collect filter 14, and filter logic 15. The collect trigger 12, the trigger logic 13, the collect filter 14, and the filter logic 15 can be respectively configured as separate threads. The SRM 11 has another main thread (not shown in FIG. 4) which starts the additional threads 12-15 of the SRM 11 and handles the exchange of the signals of the operating system and other processes.

In an exemplary embodiment, the collect trigger 12 is configured to collect predetermined status data, including, for example: the utilization of the CPU, the utilization of each individual CPU core, the storage space available in each file system, the available bandwidths of each file system, the available working memory, the size of the utilized file cache memory, the free bandwidth of data connections, and/or the usage of interfaces. These status parameters are statuses that occur in the operating system layer 8 and are obtained via a request of the collect trigger 12 to a component of the operating system layer 8. In an exemplary embodiment, the collect trigger 12 is configured to query exclusively such operating system-specific status parameters. However, defined status parameters in the application layer 10 may also be queried, but this is normally limited to defined process limits for application processes which have been established in advance. The process limits may define the maximum storage space that can be claimed, for example. In an exemplary embodiment, the collect trigger 12 is thus a thread or a function that is configured to read status parameters at the system layer, where the status parameters allow a conclusion regarding the current utilization of the print server 2.

The collect trigger 12 can be configured to relay the collected values of the status parameters to the trigger logic 13. In an exemplary embodiment, the collect trigger 12 configured such that respectively only the values of a set of predetermined status parameters are collected, and the values of this set of status parameters are passed as a data set to the trigger logic 13. The trigger logic 13 can be configured to evaluate the data while the collect trigger 12 monitors and collects status parameters again.

In an exemplary embodiment, the trigger logic 13 evaluates the values of the individual status parameters and, upon detection of a conspicuous status, the trigger logic 13 starts an active filter in the collect filter 14 in order to detect values of predetermined or all application processes of the daemon layer 9 and the application layer 10. The application processes may comprise 1000 to 2000 threads, for example, where each application process is composed of one or more threads.

In an example operation, specific collect filters 14 are triggered by specific triggers. For example, there can be a trigger that monitors the CPU load. If the corresponding threshold of the status parameter describing the CPU load is overrun or underrun, this is then evaluated in the trigger logic 13, and a collect filter 14 is possibly activated that reads values that are connected to the CPU load. These are in particular parameters of processes that, empirically, cause a high CPU utilization.

In an exemplary embodiment, a parameter table is provided in which the individual status parameters and values of the application processes and system parameters which are monitored and/or read out are defined. The table may contain, for example, the names of the parameters, the location in the file system of the operating system, the type of parameter (count, string, formatting etc.), and information as to how and to whom parameters are forwarded. The reading, the interpretation, and the relaying of the values of the parameters can be controlled using this table. For example, the direct relaying of values of defined parameters from the trigger logic 13 to the statistics evaluator 20, the process manager 21, and/or the data interface 23 can be controlled with this table. Further, all filters and triggers may access this table.

Furthermore, the trigger logic 13 and the filter logic 15 can be configured to transmit the parameters directly to a logger 16 that stores these values.

In an exemplary embodiment, the data sets of the values of the status parameters of the application processes that are obtained with the active filters of the collect filter 14 are relayed to the filter logic 15. The filter logic evaluates the values of the status parameters that are received from the collect filter 14, wherein the values may be newly combined to describe the status of the print server 2. The filter logic 15 detects extraordinary statuses according to defined, preconfigured filter rules, and in particular statuses with limited functionality, and given the presence of such a status informs the logger 16, which can store these statuses. With these filter rules, a check is normally performed as to whether one or more values of status parameters underrun or exceed predetermined thresholds.

In that the collect trigger 12 is configured as a separate thread from the trigger logic 13, the collect trigger 12 may collect multiple values of status parameters within a short time interval. The data set of these values thus describes a specific status of the print server 2 very precisely. If the filter logic and the collect trigger were to be combined into a single thread, the time intervals between the reading of the individual values of the status parameters would then be larger. Since the status may change very quickly in a computer system, a data set whose values are read over a larger time period would be significantly less meaningful. The same also applies to the separation of the collect filter 14 and the filter logic into two separate threads.

A few status parameters are monitored with the collect trigger 12 at regular intervals, for example of 0.1 s to 10 s, in order to detect the danger of a status with limited functionality. The danger of a status with limited functionality may be detected in that at least one value of a detected status parameter exceeds or underruns a predetermined threshold.

In an exemplary embodiment, the number of monitored status parameters is not greater than fifty or not greater than twenty, in particular not greater than fifteen, and often even fewer than two status parameters is sufficient. If the danger of a status with limited functionality is detected in the trigger logic 13, a filter function is started in the collect filter 14. The values of status parameters of application processes are read with this filter function in order to thus obtain an optimally specific description of the respective status. The cause of the limited functionality is documented in log files and statistics using this specific description, and a corresponding action is possibly started. This filter function is started if the danger of a status with limited functionality is detected, and the filter function is maintained as long as this danger or the status continues to exist. In an exemplary embodiment, this filter function is also maintained further for a predetermined duration after the danger of this specific status with limited functionality has already ended. Statuses of the print server immediately after conclusion or correction of the problem are hereby also detected and may be recorded by the logger 16.

The collect filter 14 may provide multiple different active filters which read different sets of status parameters depending on which extraordinary status or which danger of a limited functionality is detected with the trigger logic 13. Multiple filters may be active simultaneously.

In an exemplary embodiment, in that the filters of the collect filter 14 are only active if it is started by the trigger logic 13, data is collected only of statuses which exist in connection with an extraordinary status or a dangerous situation. No unnecessary status descriptions are hereby collected, and the utilization of the SRM 11 is kept as low as possible.

The causes of a status with limited functionality may be very different, and most often are in the area of the application processes. However, such causes always affect status parameters at the system layer. A component of the system—for example the CPU, an interface, a data connection or a storage device—is then most often overloaded, such that the other components must wait until the one overloaded component is again under normal load in order to be able to resume their operation again to a full extent. Therefore, it is most often sufficient to monitor a few status parameters at the system layer in order to promptly detect the danger of a status with limited functionality.

It is hereby to be taken into account that the waiting on overloaded components causes additional control costs due to the "scheduling" for the operating system, such that the problem is hereby further amplified. If the bottleneck is quickly located at the system layer and can be promptly counteracted, the resources may then be used significantly more efficiently.

In an exemplary embodiment, the monitoring of the status parameters at the system layer is performed at regular intervals of a few tenths of a second to a few seconds. The status parameter at the system layer may also be monitored at irregular intervals which, for example, depend a detected load state. The smaller the detected load, the longer the sampling interval may be.

In an exemplary embodiment, a status value that is monitored with the collect trigger 12 is monitored with the trigger logic 13 with regard to a warning threshold and with regard to an error threshold. If the warning threshold is exceeded or underrun, a corresponding filter of the collect filter 14 is then started. If these thresholds are underrun or exceeded, a respective warning message or error message and/or a warning or error action may then respectively be executed. This may be configured individually in advance.

It may hereby also be configured that the output of a warning or error message and/or the execution of a warning or error action is executed with a delay first, at a predetermined duration after the underrun or overrun of the corresponding threshold, wherein the threshold should still be underrun or overrun at the point in time of outputting the message or executing the action. The message is hereby not output, or the action executed, at each temporary underrun or overrun of the corresponding threshold.

If the error threshold is overrun or underrun, the corresponding filter continues to be kept active and/or a specific error filter that monitors additional status parameters is actively switched.

It may also be established that, if the warning or error threshold is over- and underrun in a rapid sequence, the warning or error action, or the warning or error message, is only executed or output once, or every n-th time, or always, or always after a specific time interval (for example every 1 to 10 sec).

In an exemplary embodiment, the SRM 11 is configured using a configuration file in the initialization of the print server 2. In this example, the triggers and the filters are established to the effect of which status parameters are monitored, the warning thresholds and the error thresholds are defined, and it is established which filters are executed in the collect filter 14 and which warning or error actions are started and/or which warning or error messages are output. FIG. 5 shows a section of such a configuration file. The triggers and the filters may alternatively or additionally also be permanently defined directly in the SRM 11. The SRM 11 may also receive rules for the triggers and filters via the data interface 23, which rules are applied in addition or as an alternative to the rules indicated in the configuration file.

Some general configuration parameters, for example the sampling frequency, the trace level and additional control parameters, are initially established in the configuration file.

In this exemplary embodiment, the monitoring of status parameters is initially configured in the first segment, in order to establish whether the CPU utilization is high. For this, the idle time of the CPU is monitored in % (="cpu. % acidle"). Furthermore, the CPU utilization of the last 15 minutes (="cpu.ldav–15") is monitored.

In an exemplary embodiment, a trigger for the trigger logic 13 is defined such that 40% of the CPU idle time is established as a warning threshold; upon falling below this, it is assessed as a danger of an error. If more than 30 processes have been waiting for access to the CPU in the last 15 minutes, the CPU utilization is then greater than 30. This is evaluated as an elevated CPU utilization (>30%) and assessed as an error risk. Here, 30 processes thus indicate a corresponding warning threshold. The error threshold for the CPU idle time is 20%, and the error threshold for the CPU utilization is 50 processes.

Given a danger of a limited functionality due to the CPU utilization, the corresponding active filter collects all processes that cause more than 30% CPU utilization ("Filter=P. % CPU>30"). These processes are written into a log file 18. The top command is additionally executed, which records all processes of the system with resource consumption and writes them into the file CPU.txt ("ErrActionData='top-b-m 1', CPU.txt', once"). A special error action is not executed here. The string "70000000, W" is output as an error message.

A second trigger is provided to monitor the CPU utilization, which second trigger monitors the number of opened files and the number of opened network connections (=handles. % UsedFHd).

In an exemplary embodiment, the utilization of specific network connections or the interfaces is monitored. For this, the status value of the respective network connection (=network. % totutil) is monitored, wherein the warning threshold is 70% and the error threshold is 80%. With an active filter of the collect filter 14, the value of the status parameter is the number of network connections. (=P.NoSoc corresponds to "No. of Sockets") read, and if the number of network connections is greater than 1, all processes are detected that cause a CPU utilization of at least 10%.

The logger 16 is configured such that the logger 16 stores data read with the collect trigger 12 and the collect filter 14 in a system log file 17 and a process log file 18. The values of the status parameters that are read with the collect trigger 12 are written by the logger 16 into the system log file 17 if one of the following is established: a common error status and/or an error status where over- or underrunning the warning threshold and/or the error threshold occurs. The values of the status parameters of the application processes that are read with the collect filter 14 are read in the process log file 18 if the corresponding filter of the filter logic 15 has detected an extraordinary status or a danger of a limited functionality. Given an unknown error status, the values of all available status parameters, or at least a majority of the available status parameters, may be detected.

In an exemplary embodiment, the writing of the corresponding values into the system log file 17 and into the process log file 18 is also respectively continued for a predetermined duration after the corresponding status with which the writing is triggered has already ended, in order to enable a comparison with a "normal status" after the fact.

In an exemplary embodiment, the SRM 11 may also have an action executor 19 that is configured to execute predetermined actions which may be triggered by the trigger logic 13. The action executor 19 may be a separate thread. Brief actions may be executed within this thread. A separate thread is started for longer actions. Different actions may be triggered for an error status and an error status. These are defined in the configuration file (FIG. 5). The type of the action given an error status or given a different error status is hereby respectively indicated. A differentiation is made between no action ("none"), a brief action for which no separate thread is started ("ExeStartShort"), and a long action for which a separate thread is started ("ExeStartLong") as action types. Furthermore, the manner of the action is defined by a predetermined data description. The following example is contained in FIG. 5:

ErrActionType=ExeStartShort
ErrActionData='top-b-n 1','CPU.txt',60"

With these lines of the configuration file, an error action is defined which has a short duration and is executed within the action executor 19, without a separate thread. Given this error action, the current output is written to the file CPU.txt. In the event that the corresponding trigger is active for longer, the writing of the data is repeated every 60 seconds.

In an exemplary embodiment, the SRM 11 includes a statistics evaluator 20 that is configured to receive the detected data directly from the trigger logic 13 and from the filter logic 15 without the data being filtered.

With the statistics evaluator 20, different statistics may be created and stored in one or more statistics files 38. A basic statistic may be created for every minute, one day, and/or long-term over a duration of multiple weeks, months or years. The statistics may be created in different formats, for example a timeline (FIG. 8), a table, or in the form of lists. The statistics primarily contain minimum, maximum and/or mean values. The individual values may be provided with a time stamp. In an exemplary embodiment, the following (but not limited thereto) system-specific status parameters can be taken into account:
- total CPU utilization,
- data throughput for each file system and for the entire file system,
- data throughput for each network interface and in total,
- the total usage of application storage by the processes, and/or
- the use of the file cache memory.

Furthermore, maximum, minimum or mean values may be detected within a predetermined time period of, for example, 1 second, 10 seconds, one minute, and be provided with date and time stamp. In an exemplary embodiment, status parameters that may be statistically detected in such a manner are, for example (but not limited to):
- data rate in MB/s of writing and/or reading, the number of read/write requests, the number of write processes respectively for each file system and for the entire file system,
- the data rate in MB/s of receiving and transmission of data via each network interface, and the number of received and transmitted data packets,
- the wait times for data of non-volatile storage media, mean CPU load, number of CPU process thread switches (context switches), and the corresponding user and the corresponding system, in order to depict the utilization of the CPU,
- number of opened files,
- size of the used application storage and of the used file cache memory,
- cleared pages per second, imported pages per second, read-out pages per second, number of page errors, and number of main page errors of a virtual main memory, and/or
- number of network connections according to predetermined standards, for example TCP (v4 & v6), UDP and/or Unix.

In an exemplary embodiment, in the application layer 10 (FIG. 2), print services 25 (services) are executed at the print server 2. These are application processes that process print data. With the collect filter 14, values of status parameters may also be collected from such print services 25, with which values the print services 25 may also be subjected to a statistical collection by the statistics evaluator 20. For example, the values with regard to the following (but not limited hereto) status parameters can be collected and statistically evaluated for each print service:
- service name
- print job identification number
- data size of the input file (GB)
- data size of the output file (GB)
- start time (date and time)
- duration of the execution of the service
- system used/utilization time
- minimum and/or maximum CPU load, possibly subdivided according to CPU cores
- minimum and/or maximum storage requirement
- minimum/maximum and/or average values for the input and output of data regarding the respective file system and with regard to the entire file system, and/or
- minimum and/or maximum values of the network utilization.

Primarily minimum, maximum and/or mean values can be hereby separately statistically collected for each service. Statistical values of services of a similar type may be combined.

The status parameters specific to the print services, for example name, job identification number, file size of the input size, and file size of the output file, may also be supplied to the statistics evaluator 20 by a module or component external to the SRM 11. The system-specific status parameters, for example status parameters that describe the CPU load, the storage requirement, the access to the file system and/or to the network, are detected by the components of the SRM 11 and provided to the statistics evaluator 20.

A print service may be executed by a single process or by multiple processes. Given multiple processes, a main process and multiple sub-processes can be provided. In an exemplary embodiment, the system-specific status parameters are detected and statistically evaluated separately for each sub-process.

In an exemplary embodiment, in addition to the print services, in the application layer 10 backend processes 26 are executed which respectively are associated with one of the printing apparatuses 3 and serve to transmit the print data to the printing apparatuses 3. These backend processes are also designated as printer drivers. They execute the transmission of the print data from the print server 2 to the printer 3. These backend processes may be recorded similar to as with the print services, wherein some printing apparatus-specific data are taken into account, for example the printer name, the printer type, the print speed, the total file size of the input file in GB, the minimum, maximum and/or average file size of each print page (for example in DIN A4). These data are delivered from an external module or component (relative to the SRM 11) to the statistics evaluator 20. These data may be supplemented with the values of the system-specific status parameters that are detected with the SRM 11, just as in the statistical collection of the print services. The statistical data may also be compiled for a specific printing apparatus.

An overall statistic may also be created for the overall operation of the print server 2. For example, this overall statistic can include the values of the following (but not limited hereto) status parameters:
- thread name, given by the process that calls the thread;
- purpose of the thread, given by the process that calls the thread;
- name of the main process;
- number of starts of the individual threads;
- start time of the threads;
- CPU time utilized by these threads; and/or
- operating duration or end time.

These thread-specific status parameters may be supplemented by the following (but not limited hereto) process-specific status parameters:
- process name;
- total CPU time used;
- CPU time used;
- minimum/maximum and/or average storage utilization;
- minimum/maximum number of minor page errors;
- minimum/maximum number of major page errors;
- parameters that describe the data throughput of the entire file system;
- parameters that describe the data throughput of the network;
- minimum/maximum number of threads;
- minimum/maximum "file handles" used; and/or
- minimum/maximum CPU time used.

In an exemplary embodiment, these statistics may primarily be evaluated given large print servers in which a plurality of threads is executed, subdivided according to the individual threads and/or according to the individual processes. It is normally unknown which thread should satisfy which function or which purpose. In this statistic, the values of thread-specific parameters are linked with the values of process-specific parameters. It is hereby possible to detect which purpose which thread has for which process, and which process-specific and thread-specific status parameters may be associated with the respective thread. With the statistic, process-specific parameters are hereby detected and stored with thread-specific parameters so that these linked data are available in a later analysis, whereby the causes of a status with limited functionality can be determined more simply. In that the purpose of the respective thread is therefore known, this may be taken into account in the control, in particular the prioritization of the individual threads.

With the SRM, system-specific status parameters and process-specific status parameters may thus be associated with a specific thread. Since threads have no names in conventional systems, in the present system names of the processes that call them are associated with the threads, such that the threads can be associated simply in a later error analysis.

In an exemplary embodiment, he SRM 11 may have a process manager 21 with which running processes may be affected at the system layer. The process manager is configured to change the priority of the individual processes as associated by the operating system as needed, for example. The access of the individual processes to the CPU may hereby be modified. Furthermore, predetermined bandwidths of the network may be associated with the individual processes. For this, corresponding tables that may be modified by the process manager may be provided in the operating system. Furthermore, in an exemplary embodiment, processes may in principle be halted temporarily. In this example, a network time-out can be hereby taken into account in that this is optimally not exceeded so that the network is not blocked by unnecessary repetitions of transmissions of data packets. Furthermore, the number of data transfers of the print jobs to be supplied may be controlled so that the available bandwidths are not overloaded.

In an exemplary embodiment, before execution of one of these actions by the process manager 21, one or more of the status parameters are reviewed, which can include, for example:

idle time of the CPU;
idle time of one or more (e.g. each) kernels running on the CPU;
free time/read times for each file system;
free storage space of each file system;
available working memory;
utilization of the file cache memory; and/or
available network bandwidths (MB/s) for each interface.

This review is in particular executed when a backend process should be started. A backend process may in no event be interrupted, which is why it is ensured by the review—for example of this status parameter—before the start of a backend process that sufficient resources are present. The backend processes have a higher priority than the service processes.

Furthermore, in an exemplary embodiment, the process manager 21 has a cache monitoring function with which current information regarding the file cache memory may be called. This information is primarily the name of the file or files stored in the file cache memory, and the available file cache memory. This information may be relayed from the process manager 21 so that they are available for the further control of the operation of the print server 2. Superordinate program components, for example a performance balancer 24 (explained in detail below) that understands the importance of the individual files, may hereby specifically influence the operation of the print server 2 and start processes that further process a file located in the file cache memory or, if the file or portions thereof are no longer required, promptly delete them from the file cache memory. This is explained in detail below.

In an exemplary embodiment, the process manager 21 has a processor configuration function with which one or more cores of the CPU, a corresponding working memory range, and/or a storage range of a mass storage (hard drive, SSD etc.) may be associated with the individual processes.

For example, via this association it is possible to initially distribute individual processes first to individual CPU cores, and to associate multiple processes with a CPU core only if all CPU cores are used, which multiple processes are then executed in quasi-parallel using Hyper-threading, for example. The cores may hereby be optimally utilized.

In an exemplary embodiment, this configuration may be executed using a CPU core table in which are registered all processes to be executed on the CPU. Stored in this table are the process name, the process identification number, the process priority, the incurred number of cores, the requested amount of storage, the current CPU core mask, the current CPU demand, and the current storage demand.

A GUI interface 22 is provided in order for the user of the print server 2 to receive warning and error messages as well as predetermined status descriptions. This GUI interface 22 sends all warning and error messages to a GUI of the print server 2 in order to present them at a corresponding display device. The predetermined status descriptions include, for example, the total CPU utilization, the utilization of each file system, the utilization of each network interface, the size of the utilized working memory, the size of the file cache memory. This status description may be called by the user at the display device, for example by clicking on a predetermined icon.

A data interface 23 is provided in the SRM 11, which can be configured to provide the data and statistics collected in the SRM 11 to other components, in particular to the performance balancer 24 explained in detail below.

In an exemplary embodiment, the SRM 11 is configured to detect values of system-specific status parameters at regular intervals using the collect trigger 12. The data of the system log file 17, the process log file 18 and the statistics are hereupon each updated as needed. The data interface 23 hereby generates an SRS message (System Resource Status notification) each time in order to indicate the last executed update of the data. It typically occurs once per second.

The data interface 23 may also generate messages given the presence of a bottleneck of a specific system resource (System Resource Shortage Modification), which are triggered primarily given a warning status or error status.

Furthermore, the data interface 23 may receive a request (Process Core Map Request) as to which core or which cores should be associated with a predetermined process, in particular a print service, of the CPU.

Upon a predetermined request to monitor the usage of the resources by a predetermined process, the data interface 23 may collect the corresponding values of the status parameters of these resources and respond with a corresponding message (Process Resource Usage Notification) after the end of the process.

Furthermore, the data interface 23 may receive a request for the available storage space at a specific storage device (RAM disk, SSD, HD) and respond accordingly.

In addition to these special requests and messages, the data interface 32 may in particular allow the performance balancer 24 access to individual data values; arbitrary sets of data values, in particular data sets describing respective determined statuses; and all data that are present in the system log file, in the process log file and in the statistics.

In summary, it may thus be established that data of status parameters may be detected at the system layer, additionally be filtered via data of status parameters at the process layer, and be archived as necessary, with the SRM 11 explained above. A characteristic of this SRM is that status parameters at the system layer are monitored in order to establish a status with limited functionality, in particular an overload of the system. Furthermore, the acquired data may be statistically evaluated and provided to additional components, for example a GUI or a performance balancer. Moreover, the SRM 11 allows a direct access to the process control at the system layer using the program manager 21. The SRM 11 is thus a component in the daemon layer 9 that can be linked directly to the operating system 8 or to the kernel of an operating system (FIG. 2).

In the layer model depicted in FIG. 2, the performance balancer 24 is interposed between the SRM 11 and multiple application processes of the application layer 10. These application processes primarily comprise the print services 25 and the backend processes 26 addressed above.

In the following, the performance balancer 24 is explained in detail:

With the performance balancer 24, processes—in particular the print services 25 and the backend processes 26—are controlled and optimized at the print server so that both the print server and the printing apparatuses 3 are utilized as optimally as possible. In order to achieve a maximum performance, the resources are to be utilized as optimally as possible. The number of active processes is to be adjusted so that, on the one hand, as few resources as possible are unused, and on the other hand no bottlenecks occur which bind up additional computing capacity for the scheduling or arbitration of the processes/threads.

Figure 6:
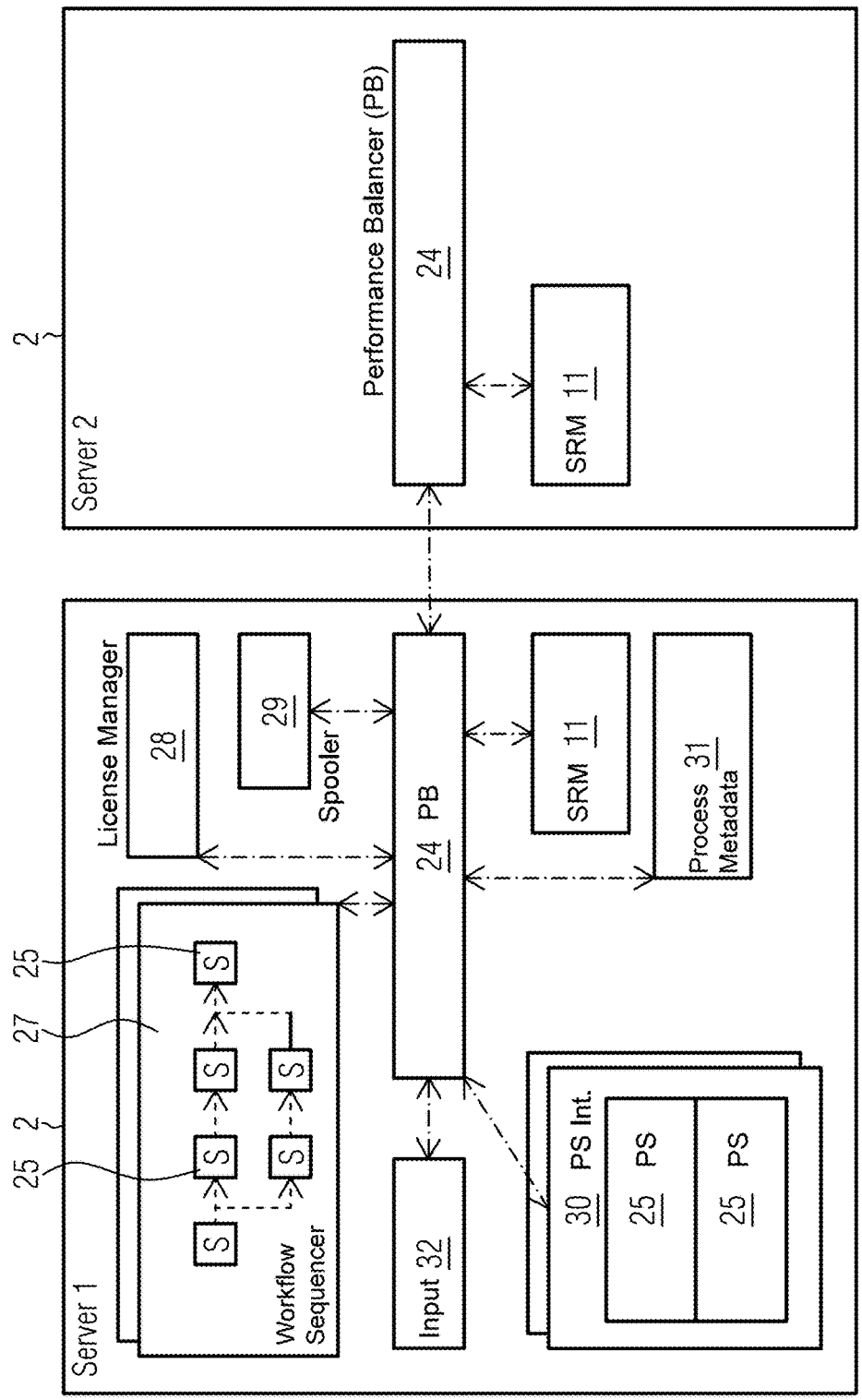
FIG. 6 illustrates components of a print server configured to control print services according to an exemplary embodiment of the present disclosure.

In an exemplary embodiment, also provided at the print server 2, in addition to the performance balancer 24, are a workflow sequencer 27, a license manager 28, a spooler 29 (printer spooler), a print service interface 30, a metadata processor 31, and the SRM 11 explained above (FIG. 6). In principle, it is possible that two print servers 2 are coupled with one another, where the performance balancer 24 of the two print servers 2 divide or exchange data about the print services 25 and the backend processes 26 which may be handled via one of the two print servers 2 depending on capacity. In principle, the respective print jobs are transmitted to both print servers, which print jobs are then processed by the print server that can provide the required resources first. Before starting the execution of a print job, the respective print server checks whether this print job has not already been processed by another print server. Only if it has not yet been processed is the execution of this print job started.

In an exemplary embodiment, the workflow sequencer 27 is configured to establish the processing of each print job, wherein primarily the sequence of the print services 25 with which the print data contained in the print job are processed is established. The order of the print services 25 is symbolically shown in FIG. 6 in the block representing the workflow sequencer 27.

The license manager 28 contains the license information regarding the individual components of the print server 2. These also include the license information regarding the print services 25, whereby it is provided which print service 25 may be executed and how many instances (runtime versions) of the respective print service may be executed at the print server 2.

The spooler 29 maintains the respective print data for each printer 3.

The corresponding software configured to execute the print services 25 is provided with the print service interface 30.

The metadata processor 31 collects data from the started print services 25 and creates one or more log files for the print services 25.

Figure 8:
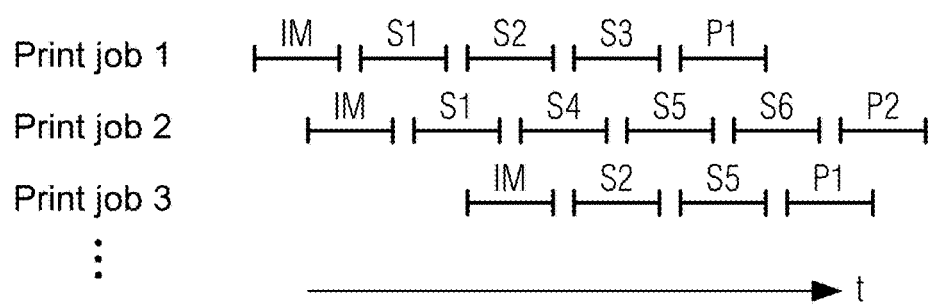
FIG. 8 illustrates a chronological workflow of individual processes of print services at the print server according to an exemplary embodiment of the present disclosure.

In an exemplary embodiment, the workflow sequencer 27 creates the print jobs from specific data, in particular creates from job tickets contained in the print jobs a description of the order of the individual steps that are to be executed at the print server 2 with the print data. FIG. 8 schematically shows the workflow of the individual steps for three print jobs. First, the print data are imported by input 32 and then are processed as needed with one or more print services (S1-S6). If the print data at the print server 2 are entirely processed, they are printed out (P1: at the printing apparatus 1; P2: at the printing apparatus 2). The metadata processor 31 detects the execution of the individual steps and then generates a data set with the respective point in time of the beginning and end of the respective step for each print job.

In an exemplary embodiment, the metadata may be presented to a user at a graphical user interface (GUI) in a graphic, similar to that of FIG. 8.

In an exemplary embodiment, the workflow sequencer 27 is configured to control the workflow of the individual work steps, and in particular of the print services 25 and the backend processes 26. If a print service 25 or a backend process 26 is to be started, the workflow sequencer 27 then sends a process start request 39 (Service Start Request) to the performance balancer 24.

Figure 7:
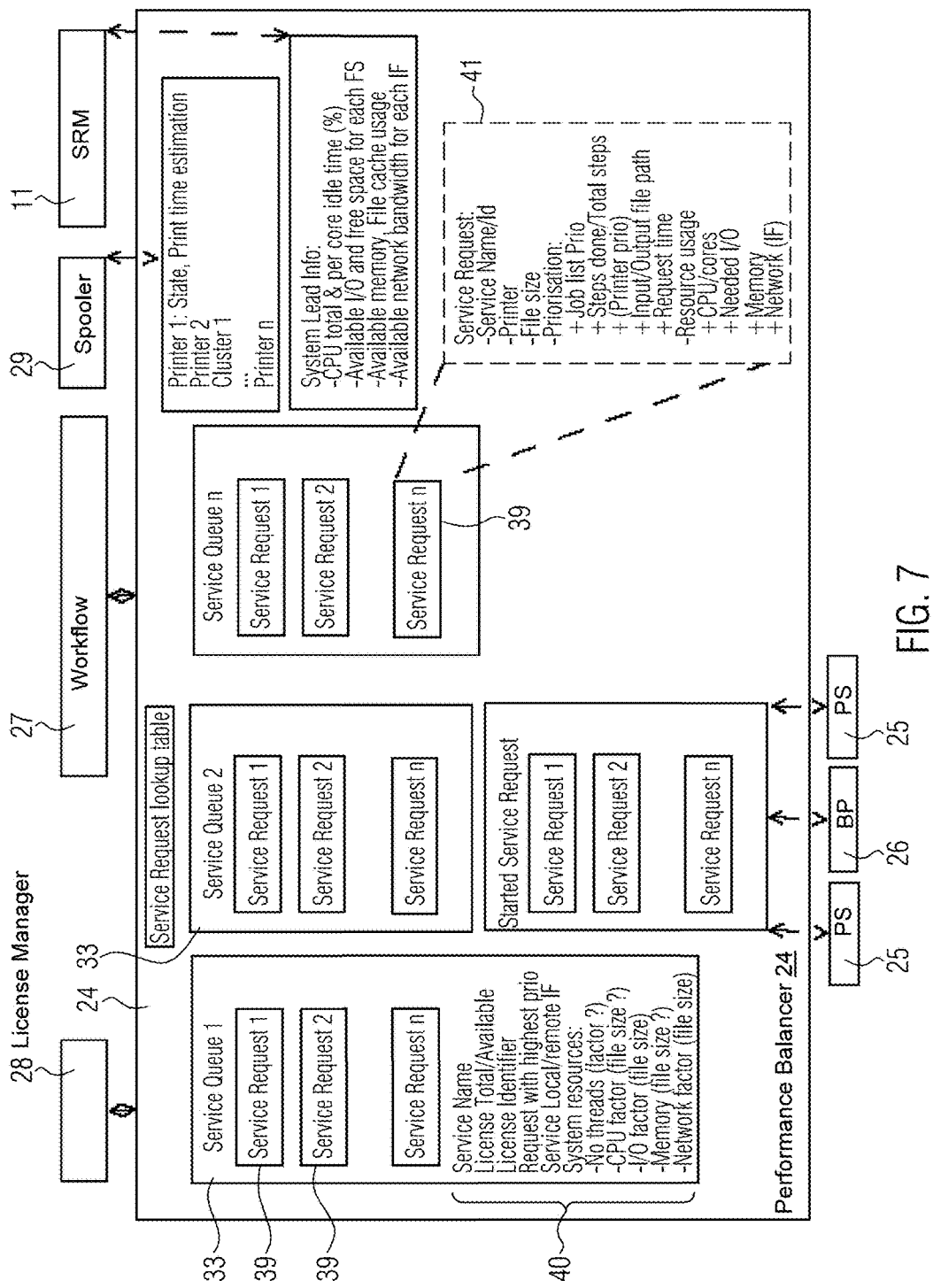
FIG. 7 illustrates a performance balancer according to an exemplary embodiment of the present disclosure.

In the performance balancer 24, a separate service list (service queue) 33 is provided for each print service 25 (FIG. 7). Arranged in the individual service lists 33 are the corresponding process start requests 39, wherein each service list includes print service information 40 which describes the respective print service. This print service information contains, for example, the name of the respective print service or backend process; information as to whether the corresponding license is available; information regarding the priority of the print service or of the backend process; and process usage factors (explained in detail below). The process start requests 39 contain process start information 41 that renders the respective process start request in more precise detail, for example the name of the respective print service or backend process, information regarding the printing apparatus, regarding the file size, priority factors, and information regarding the resource requirement, for example additional process usage factors.

From the spooler 29, the performance balancer 24 receives status information regarding the individual printing apparatuses, in particular whether they are active, the printing time of the available print jobs etc. Using this status information of the spooler, the performance balancer 24 may detect when which printing apparatus requires new print jobs, i.e. that the print jobs present in a print queue (=spool) in the spooler 29 for a specific printer 3 underrun a processing duration threshold. Such an underrun of the processing duration threshold means that, if no new print jobs are supplied to the print queue, the printing apparatus is halted if all print jobs have been executed. One wants to avoid this. Therefore, the performance balancer elevates the priorities of print jobs suitable for this printing apparatus.

From the SRM 11, the performance balancer 24 receives the values of the status parameters that describe the utilization of the print server. These are in particular the idle time of the CPU for the entire CPU and for each individual core; the free storage space of each file system and the available data throughput of the file systems; the available working memory; the available network bandwidth for each interface to the network; and information regarding the file cache memory that is used, which information is transmitted unfiltered from the trigger logic 13 via the data interface 23 to the performance balancer 24.

The performance balancer 24 checks the available system resources for the individual process start requests, calculates the resource usage to be expected with resource usage factors (explained in detail below), and then decides, using the available system resources, whether a specific print service or backend process may be started. It is hereby avoided that too many processes are started simultaneously and mutually hinder access to the system resources. It is hereby ensured that each print service 25, and most of all each backend process 26, may be executed properly without delay at the print server 2.

In an exemplary embodiment, the system resources that are hereby taken into account can include one or more (but not limited herein) of the following resources:
licenses;
idle time of the CPU;
idle time of the individual clients of the CPU;
sufficient storage capacity of the required file system or systems;
sufficient input and output bandwidth at the required file systems;
sufficient working memory;
available license; and/or
available printing apparatus.

In an exemplary embodiment, additional factors may be taken into account, for example:
the priority of each print service, and/or
in the event that the input or output file is not present on a local file system, the free bandwidth of the network is to be taken into account.

In an exemplary embodiment, the priority may be composed of one or more of the following components (listed in order of decreasing importance):
1) print jobs for specific printers comprising less than n minutes of printing time;
2) priority of the print jobs as established by the user;
3) input file is in the file cache memory;
4) number of executed process steps or print services (the more print services that are executed, the higher the priority);
5) number of process steps which have yet to be executed (the more process steps that are to be executed, the higher the priority); and
6) wait time for the print services (priority increases with increasing wait time).

In an exemplary embodiment, if print jobs for a printing time of less than n minutes are available for a printing apparatus (printer), the elevation of the priority then leads to a preference of a suitable print job with which sufficient print jobs are again provided for this printer.

If the input file is located in the file cache memory, it may then be quickly processed further, i.e. without a slow access to the hard drive, which is why it is reasonable to elevate the priority in this instance. The resource usage factors are associated with each print service. The resource usage factors are provided for the different resources of the print server 2, and in particular for the different system resources. The resource usage factors describe how strongly the respective print service or backend process utilizes the corresponding resource. Most resource usage factors are to be multiplied with the file size of the file to be processed in order to determine the usage or the load that is caused by the processing of this file by this print service. In order to calculate the expected usage, the resource usage factors may, instead of a multiplication, also be linked in another way with predetermined values, for example the file size, data throughputs, storage spaces, control parameters which indicate how the individual services are executed etc. These control parameters require specific write or read processes, for example, in that they define that a file should be duplicated, modified (in particular converted), or deleted.

These resource usage factors thus allow the performance balancer 24 to predict how long the execution of the respective print service to process a specific file will take, and which resources will hereby be utilized. With the process resource usage message (Process Resource Usage Notification explained above) that is generated by the data interface 23, the performance balancer 24 may receive current information about the resource usage of a specific service for the processing of a specific print job or of a specific print file. With these data, the process usage factors may be adapted to the current values and updated. The statistical basis of the resource usage factors hereby becomes increasingly broader over time, and the reliability of the prediction accordingly becomes better.

These resource usage factors may also be used by the workflow sequencer 27, in addition to by the performance balancer 24, to determine the execution time of the individual print services.

Not only the estimation of the duration of the execution of a print service 25 but also the estimation of the usage of the individual resources is important to the performance balancer 24 in order to decide whether a print service 25 may be started. Since a large database for the current resource usage is present with the SRM 11, without the generation of this database claiming a great amount of computation time of the print server 2, the performance balancer 24 may very precisely estimate the resource usage by the individual print services and backend processes and ensure that too many print services 25 and backend processes 26 are not started in parallel at the print server 2, whereby an overload situation would arise which could cause an unintended halting of one of the printing apparatuses. On the other hand, specific print services 25 that used more resources than were available may also be deferred, and other print services that use fewer resources—and primarily those resources that are free—may be started. The utilization of the print server 2 is hereby optimized so that a greater throughput of print jobs is possible given the same computing capacity.

The performance balancer 24 may also influence the print services 25 or backend processes 26 to be executed to the effect that the write and read load of the storage devices of the print server 2 is reduced, and thus the processing of the print jobs is accelerated.

Figure 3A:
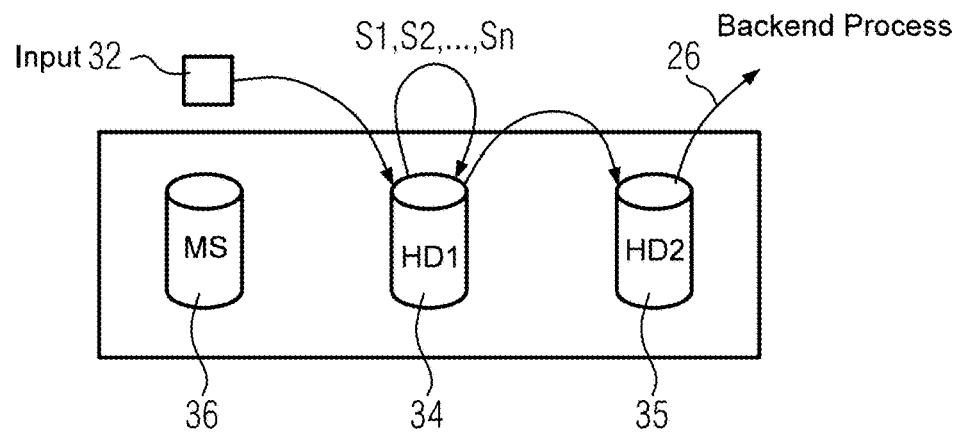
FIG. 3a illustrates an example of a storage structure of the print server.

FIG. 3a shows an example storage system for a print server. This storage system has a first logical hard drive 34 and a second logical hard drive 35. A third mass storage medium 36 is provided that serves to house the operating system, application programs, control data and trace data.

The first hard drive 34 serves to house the print data (PD), and the second hard drive 35 serves to house the print data already prepared for printing (R2P: Ready to Print). Incoming print jobs (PD) are written to the first hard drive with the input 32. Upon implementation of one of the print services 25, the print data are respectively read from the first hard drive 34 into the working memory, processed, and written again to the first hard drive 34. This is repeated for each print service. After the last print service Sn, the print data are copied from the first hard drive 34 to the second hard drive 35 (R2P). They are transmitted from the second hard drive 35 to the corresponding printer 3 with a backend process 26. Each write and read process requires a corresponding computation time to write and read the data from and to the hard drive.

A first possibility to accelerate the method is to elevate the priority of a print service 25 via the performance balancer 24 if the corresponding data are located in the file cache memory. They may then be read from the file cache memory and be stored there again. At least one read process or one write process at the first hard drive 34 is hereby avoided.

The combination from the use of the file cache memory and the non-volatile storage 34, 35 for storage of the version of the print data received via the input, and of the complete print data prepared for the printing process, produces a high level of operational security and nevertheless a significant increase in throughput in comparison to conventional methods.

In an exemplary embodiment, the performance balancer 24 is configured to which specific files are located in the file cache.

The performance balancer 24 may affect the file cache as follows:

The performance balancer 24 may delete files, or a specific file, in the file cache in that it outputs a corresponding deletion job to the SRM 11, which executes the deletion process.

The performance balancer 24 may receive (for example from the process start requests) the information of which process (print service or backend process) uses the file cache. The performance balancer may thus specifically start one or more processes that use the file cache.

The performance balancer 24 may start processes so that they immediately delete the files that they process from the file cache if they are no longer required.

Since the performance balancer may evaluate both system-specific information (which are read by the collect trigger, for example) and process-specific information (which are read by the collect filter or are contained in the service lists 33 or the process start requests, for example), the performance balancer 24 may influence the system, wherein information at the process layer are taken into account in this influencing. The control of the files in the file cache is a typical example of this.

Figure 3B:
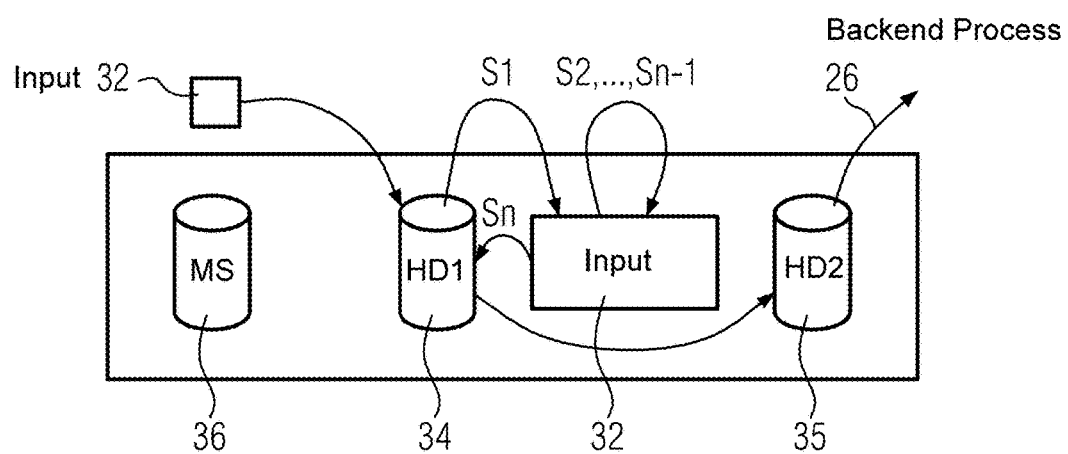
FIG. 3b illustrates a storage structure of a printer server according to an exemplary embodiment of the present disclosure.

In an exemplary embodiment, a second possibility that may be applied alternatively or in combination with the first possibility in order to accelerate the processing of the print data is to additionally provide a RAM disk 37 or an SSD (RAID 0) (FIG. 3b). A RAM disk is a virtual and temporary data medium in the working memory (RAM) of a computer. A certain portion of the working memory is reserved statically or dynamically for the RAM disk, and is thereby addressed like a hard disk or like an extra drive. A RAM disk is limited in size but extremely fast. In addition to this, the RAM disk is administered by the operating system like a hard drive, such that the data stored in the RAM disk does not need to be written to the hard drive. Given use of a RAM disk, the file to be processed with the print services 25 is to be chosen or possibly to be divided so that the entire file may be stored in the RAM disk, such that all print services 25 may be executed on this file without a re-storage on a hard drive being necessary. Given a provided RAM disk, the performance balancer 24 may assess whether the print file to be processed may remain on the RAM disk during the processing by the print services. If this is the case, it is advantageous if the performance balancer 24 starts the corresponding print services 25 to process the print data on the RAM disk. If the print file to be processed is too large, a check is then to be performed as to whether the print file may be divided so that the individual parts of the print file are printed out independently of one another at a printing apparatus. If this is possible, the print file is subdivided accordingly so that the divided sections of the print file on the RAM disk are processed using the print services 25, and then the print data prepared for printing are stored on the first logical hard drive 34. From there, the print data are copied to the second logical hard drive 35 in order to be transmitted to the printer by the backend process 26. The print files to be stored in the RAM disk may be administered by the SRM.

This method is based on the realization that only the first version of the print data file that is written by the input 32 to the first hard drive 34 and the last complete version of the print data file, prepared for the printing process, that is copied to the second hard drive 35 are important for the execution of the method. If the method is interrupted by a system error and the versions generated in between are lost, then the processing method may be resumed again quickly if these two versions are present, since the intermediate versions can be reproduced from the first version with the print data services 25 and, if the last version is present, the transmission of the data to the printing apparatus may be continued without the printing apparatus needing to wait until the data are entirely prepared again.

An additional advantage of the use of a RAM disk is that often the data stored on a hard drive in printing systems are to be encrypted. If the RAM disk is a volatile data storage, which is normal, then no encryption is necessary. That means that no encryption and decryption is to be performed between the individual print services 25, which further increases the processing speed and preserves system resources, since an encryption or decryption significantly burdens the CPU.

The combination of the use of a RAM disk 37 in connection with the performance balancer 24, which checks in advance whether the processing of the print data on the RAM disk is possible, allows a significant acceleration of the method.

The first hard drive 34 may hereby be designed with a large storage capacity and low processing speed. Such hard drives are cost-effective and allow the caching of multiple print jobs. In such an embodiment, the costs are significantly decreased in comparison to a conventional storage structure, since it was previously typical to provide the first and second hard drive 34, 35 with large storage capacity and high throughput, which is accordingly expensive.

Instead of a RAM disk, an SSD may also be used. An SSD with larger storage capacity may be provided, which is why the limitations occurring with a RAM disk are not present here. However, an SSD is significantly slower than a RAM disk, but faster than a conventional hard drive. Like a hard drive, an SSD is additionally controlled by the operating system, and the data may be automatically encrypted accordingly, which further limits the processing speed. In an exemplary embodiment, a RAM disk is used instead of an SSD for this reason.

In an exemplary embodiment, the capacity balancer is configured such that, given use of a RAM disk or an SSD, the RAM disk or the SSD is used to store print data via predetermined processes without the file cache being used to store print data, which then is made available exclusively to one or more other processes.

Whether a RAM disk is used or, according to the first possibility, the priorities are controlled so that the files remain in the file cache memory upon processing by the print services, the throughput is similarly significantly accelerated. This means that either fewer hardware resources are necessary in order to achieve the same throughput, or a higher throughput is achieved given similar hardware capacities.

In principle, it is also possible to design the printing system according to FIG. 3b with a second hard drive 35 and a RAM disk 37, and to implement the processing of the respective print file on the RAM disk 37 or on the second hard drive 35 depending on the size of the print files.

It has already been explained above that the processes are respectively initially associated with a core of the CPU using the process manager 21, and only when a process has been associated with all cores is an additional process associated with one of the cores, and this core is operated in Hyper-threaded mode, wherein two processes share a core. This association may be controlled by the performance balancer 24, which starts the individual print services 25 and hereby associates them with a corresponding core.

The performance balancer 24 may also be used to optimize the use of the file cache memory. Using the process manager 21, the performance balancer 24 knows the available storage space of the file cache memory and which files are located therein.

In an exemplary embodiment, the performance balancer 24 is configured to check whether the files located in the file cache memory are to be processed by additional print services 25 and/or may be transmitted directly, without interruption, from the file cache memory to the printing apparatus 4 by the backend processes 26. If this is the case, then the priorities of the corresponding print services 25 are elevated so that the print data located in the file cache memory are processed further without being cached on a hard drive.

Furthermore, in an exemplary embodiment, the performance balancer 24 may check whether the files contained in the file cache memory are still to be processed further by another process. Due to a successive processing of the files contained in the file cache memory, it is not necessary to read these repeatedly from the hard drive into the file cache memory. Given a successive processing of a file located in the file cache memory, a transfer of the file from the file cache memory to a hard drive between the individual processing of the different processes may be suppressed. Given a file cache memory, a writing of the data may be only indirectly suppressed in that the individual steps are executed without interruption, in that the operating system does not execute the automatic (and in principle not suppressible) saving to the hard drive. The saving of the data from the file cache memory may only be safely avoided if the corresponding data in the file cache memory or the corresponding file are generally deleted.

In contrast to this, given use of a RAM disk the method may be controlled so that a caching of the files or print data to be processed is in principle not executed, and the files or print data are stored on the hard drive only at specific processing steps, in particular only after the complete execution of all print services.

In these two methods, on the one hand information that are obtained at the system layer (name of the file in the file cache memory or free storage capacity of the file cache memory) and information at the process layer (the file contained in the file cache memory may be further processed or not) are taken into account in order to decide how the priorities of the print services or backend processes are set in order to control the further method workflow accordingly. The linking of system-specific and process-specific information allows a significant increase in efficiency.

An additional method to accelerate the processing of the print data lies in the dynamic control of the use of the system resources via the performance balancer 24.

Since the SRM 11 regularly queries system parameters at the system layer and provides the corresponding values either directly or indirectly in the form of a statistical evaluation, or in the form of a value combined from multiple individual values, to the performance balancer 24 via the data interface 24, this may control the processes during the execution of said processes so that the resource utilization with regard to the entire system is optimized.

For example, it may be appropriate to execute specific processes only at one CPU chip. This may be controlled by the performance balancer, for example via association of a CPU chip with a process using a CPU core mask at the start of the respective process. It is hereby avoided that the data that is processed in this process are not divided up among different working memories, which claims additional computing capacity because the access to data that are stored in the working memory of another CPU chip is slow.

The individual processes may also be associated by the performance balancer with specific cores of the CPU chip, as has already been briefly described above in the explanation of the process manager 21. Given a process start request by the workflow sequencer 27, this is initially checked by the performance balancer. The performance balancer may hereby request a current CPU core mask from the SRM, in particular the process manager 21, in which is specified which process may be executed at which core. The performance balancer may then associate one or more cores with the new process and note this in the core mask. This core mask is then passed to the operating system, in particular the kernel, at the start of a process. The process is then started so that it is executed only at the assigned cores. The use of Hyper-threading may hereby be kept low, and the cores may be utilized optimally.

Furthermore, using the information provided by the SRM the performance balancer may detect and clear unnecessary storage capacity that is reserved for a specific process. For this, contained in the software of the print services are program sections with which the performance balancer may communicate directly. In this example, the print services or their runtime instances interface (communicate) with the performance balancer to establish available storage space and delete it as necessary. The storage capacity may hereby be better utilized overall.

If, within a predetermined sampling interval (for example of one second) it is established that specific system capacities are exhausted or will be exhausted, in particular the input and output bandwidths of a file system, of a storage device, and/or of a network, then specific print services or their runtime instances may be put to sleep by the performance balancer 24 for a predetermined duration, and in particular the remaining duration of the sampling interval, so that other processes may use the other resources unhindered. For this, also contained in the software of the print services are program sections with which the performance balancer may communicate directly, wherein the software contains a delay section so that the performance balancer may directly control the print services or their runtime instances in order to delay them. Such a delay is primarily appropriate if a backend process requires the resources that are used by the delayable print service.

The print services may thus have program sections which, for control purposes, communicate directly with the performance balancer and/or can be controlled directly by the performance balancer in order to be modified in terms of their execution during their run time.

Listed herein are different methods according to exemplary embodiments to influence the utilization of the print server. In one or more embodiments, system statuses that are detected using the monitored system parameters are used by the performance balancer 24 in order to engage processes existing in the workflow. Advantageously, given knowledge of the processes, a monitoring of system parameters is used to intelligently control processes at the process layer using the performance balancer 24 so that the throughput (e.g. entire throughput) is optimized. The SRM thus intelligently provides information about the status of the system at the operating system layer and process layer, which information is used by the performance balancer to control the entire system, wherein engagement may take place at the operating system layer in that specific resources are associated with the individual processes or are released for these processes, for example the use of specific storage ranges or storage types by specific processes, in particular of the file cache memory; and/or the distribution of processes to CPU chips and/or cores; or, the priorities of the individual processes are controlled.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, "processor circuitry" can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 printing system
2 print server
3 printing apparatus (also referred to as printer)
4 data line
5 Internet (or other network)
6 client
7 hardware layer
8 operating system (OS) layer
9 system service (daemon) layer
10 application layer
11 System Resource Manager (SRM)

12 collect trigger
13 trigger logic
14 collect filter
15 filter logic
16 logger
17 system log file
18 process log file
19 action executor
20 statistics evaluator
21 process manager
22 GUI interface
23 data interface
24 performance balancer
25 print service (PS)
26 backend process (BP)
27 workflow sequencer
28 license manager
29 spooler
30 print service interface
31 metadata processor
32 input
33 service list
34 first hard drive
35 second hard drive
36 mass storage
37 RAM disk
38 statistics file
39 process start request
40 print service information
41 process start information

The invention claimed is:

1. A print server operable with a digital high-capacity printing system with which one or more print jobs are received, processed with predetermined application processes, and relayed to one or more printers, the print server comprising:
a memory having a computer program stored thereon; and
a processor including a trigger logic configured as a first thread of the processor and a collect trigger configured as a second thread of the processor separate from the first thread to increase a monitoring frequency of status parameters by the collect trigger that correspond to system statuses of the print server to increase an accuracy of a data set of monitored status parameters, the processor being configured to access the memory and execute the computer program to:
monitor, at the monitoring frequency by the collect trigger, the status parameters corresponding to system statuses of the print server to generate the data set of the monitored status parameters;
trigger, by the trigger logic, filters to read additional status parameters based on the data set of the monitored status parameters to determine whether the system statuses monitored with the collect trigger represent an extraordinary or abnormal operating status of the print server or of the printing system, the additional status parameters including process statuses of application processes executed at the print server; and
execute an error action based on the determination to adjust an operating state of one or more of the application processes.

2. The print server according to claim 1, wherein the trigger logic determines an extraordinary or abnormal operating status in response to at least one value of one of the monitored status parameters exceeds or underruns a predetermined threshold.

3. The print server according to claim 1, wherein a number of status parameters that are monitored with the collect trigger is less than or equal to twenty.

4. The print server according to claim 2, the processor is further configured to: comprising:
monitor the at least one value with regard to a warning threshold values;
monitor the at least one value with regard to an error threshold value, wherein the warning threshold value is different from the error threshold value; and
execute a warning or error message and/or a warning or error action in response to an overrun or an underrun of the corresponding warning threshold and/or error threshold values.

5. The print server according to claim 1, wherein the processor is further configured to:
combine the filters for reading the statuses of the application processes into a collect filter; and
filter, using a filter logic of the processor, values of predetermined status parameters of the statuses of the application process.

6. The print server according to claim 5, wherein the processor is further configured to check, using filter rules, the filter logic to determine whether one or more values of the status parameters exceed or underrun predetermined thresholds to establish an extraordinary operating status.

7. The print server according to claim 1, where one or more of the triggered filters continue to be active for a predetermined duration after a detected extraordinary operating status.

8. The print server according to claim 5, wherein the values of the status parameters that are detected upon monitoring and possibly filtered are provided to a performance balancer via a data interface to control print services.

9. The print server according to claim 5, wherein the values of the status parameters that are detected upon monitoring and possibly filtered are statistically evaluated using a statistics evaluator of the processor.

10. The print server according to claim 9, wherein the statistics evaluator is configured to statistically link values of process-specific parameters with values of system-specific parameters.

11. The print server according to claim 9, wherein the statistics evaluator is configured to statistically link values of process-specific parameters with values of thread-specific parameters.

12. The print server according to claim 5, wherein the read and possibly filtered values of the status parameters are stored in at least one log file using a logger.

13. The print server according to claim 1, wherein the monitoring of status parameters is executed at regular time intervals or at variable time intervals depending on a detected load status, wherein the lower the detected load status the longer the variable time intervals.

14. The print server according to claim 1, wherein the processor comprises:
a process manager that is configured to affect running processing and modify predetermined system parameters, and
a performance balancer that is configured to directly affect predetermined processes during the run time.

15. The print server according to claim 1, wherein the processor is further configured to:
read and provide predetermined parameters of a file cache memory to control of the operation of the print server, wherein the predetermined parameters include the file name or names of the files stored in the file cache memory, the size of the files stored in the file cache memory, and/or the free memory space of the file cache memory.

16. The print server according to claim 1, wherein the system statuses comprise:
   a CPU load;
   a working memory load;
   a file system load;
   a network load; and/or
   a system interface load.

17. The print server according to claim 1, wherein the processor is further configured to determine whether the error action is to be executed using a separate thread of the processor based on an estimated duration of the error action.

18. The print server according to claim 1, wherein adjusting the operating state of the one or more application processes includes halting the one more application processes.

19. The print server according to claim 1, wherein adjusting the operating state of the one or more application processes includes adjusting a priority of the one more application processes.

* * * * *